United States Patent

Russ et al.

[11] Patent Number: 5,911,391
[45] Date of Patent: Jun. 15, 1999

[54] APPARATUS FOR LOCKING AIRCRAFT CONTROLS

[76] Inventors: Richard T. Russ, 4117 NW. 144th, Oklahoma City, Okla. 73134; Thomas C. Williams, 11108 Coachman Rd., Yukon, Okla. 73099

[21] Appl. No.: 08/878,382

[22] Filed: Jun. 18, 1997

Related U.S. Application Data

[63] Continuation-in-part of application No. 08/653,894, May 28, 1996, Pat. No. 5,713,539.

[51] Int. Cl.$^6$ .................................................. B64C 13/14
[52] U.S. Cl. ............................ 244/224; 70/237; 70/198; 70/200; 70/203
[58] Field of Search .............................. 244/224; 70/237, 70/198, 200, 203, 212, 238, 199; 403/316, 315, 379.5, 378

[56] References Cited

U.S. PATENT DOCUMENTS

| | | |
|---|---|---|
| 1,531,062 | 3/1925 | Barravecchia . |
| 2,035,231 | 3/1936 | Haberstro, Jr. ............................ 244/1 |
| 3,298,242 | 1/1967 | Smith ...................................... 74/495 |
| 3,330,504 | 7/1967 | Lewis . |
| 3,550,409 | 12/1970 | Pariser . |
| 3,690,131 | 9/1972 | Davis ...................................... 70/203 |
| 3,833,190 | 9/1974 | Gaio ........................................ 244/83 |
| 3,898,823 | 8/1975 | Ludeman ................................. 70/200 |
| 4,208,026 | 6/1980 | Reynolds ................................ 244/224 |
| 4,475,366 | 10/1984 | Marneris . |
| 5,129,603 | 7/1992 | Wippler .................................. 244/224 |
| 5,724,838 | 3/1998 | Alicea . |

OTHER PUBLICATIONS

Four catalog pages showing various types of locks for use on aircraft, source unknown, not dated.

*Primary Examiner*—Charles T. Jordan
*Assistant Examiner*—Tien Dinh
*Attorney, Agent, or Firm*—Dunlap, Codding & Rogers, P.C.

[57] ABSTRACT

A locking apparatus in combination with a locking pin and method for rigidly interlocking a control wheel and the rudder pedals of an aircraft is provided for securing the control surfaces of the aircraft operated by the control wheel and the rudder pedals in a stable position. The locking pin is adapted to be disposed through aligned locking pin receiving holes of the control column and the control panel collar and has a recess formed therein for lockingly receiving a portion of the control column. The locking apparatus includes a pair of control wheel retaining members rigidly connected to one end of a rod member for retainingly engaging the control wheel and a rudder pedal engaging bar rigidly connected to one end of another rod member. The rudder pedal engaging bar is positionable in a V-shaped notch of each of the rudder pedals so as to engage each of the rudder pedals and so as to secure the rudder pedal engaging bar on the rudder pedals. The rod members are disposed in a telescoping relationship with respect to one another and are adjustably securable whereby the control wheel retaining members are rigidly locked in a selected position relative to the rudder pedal retaining bar wherein the control wheel retaining members cooperate with the rudder pedal retaining bar to support the control column in a pin locking position wherein the control column is lockingly disposed in the recess of the locking pin.

25 Claims, 5 Drawing Sheets

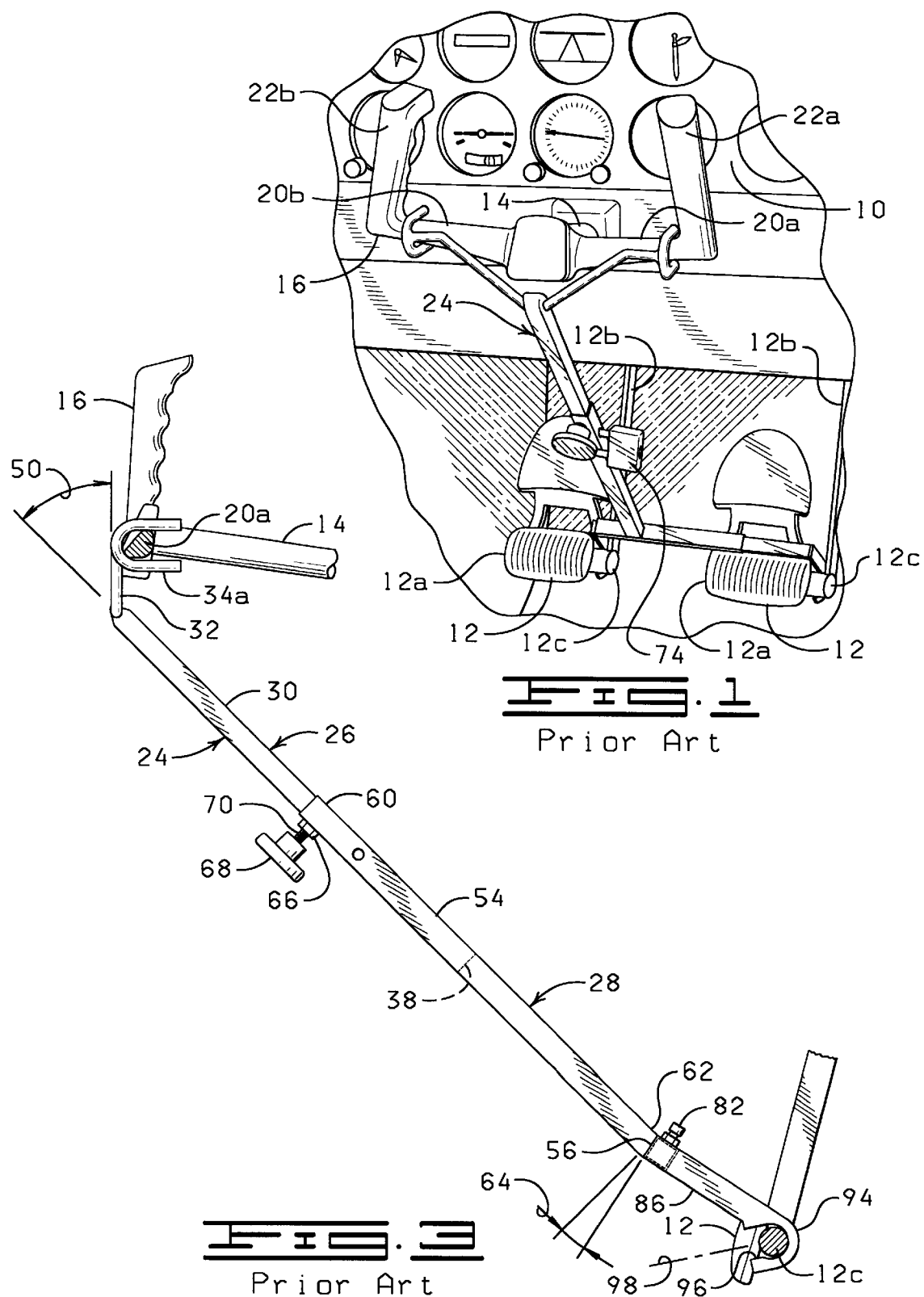

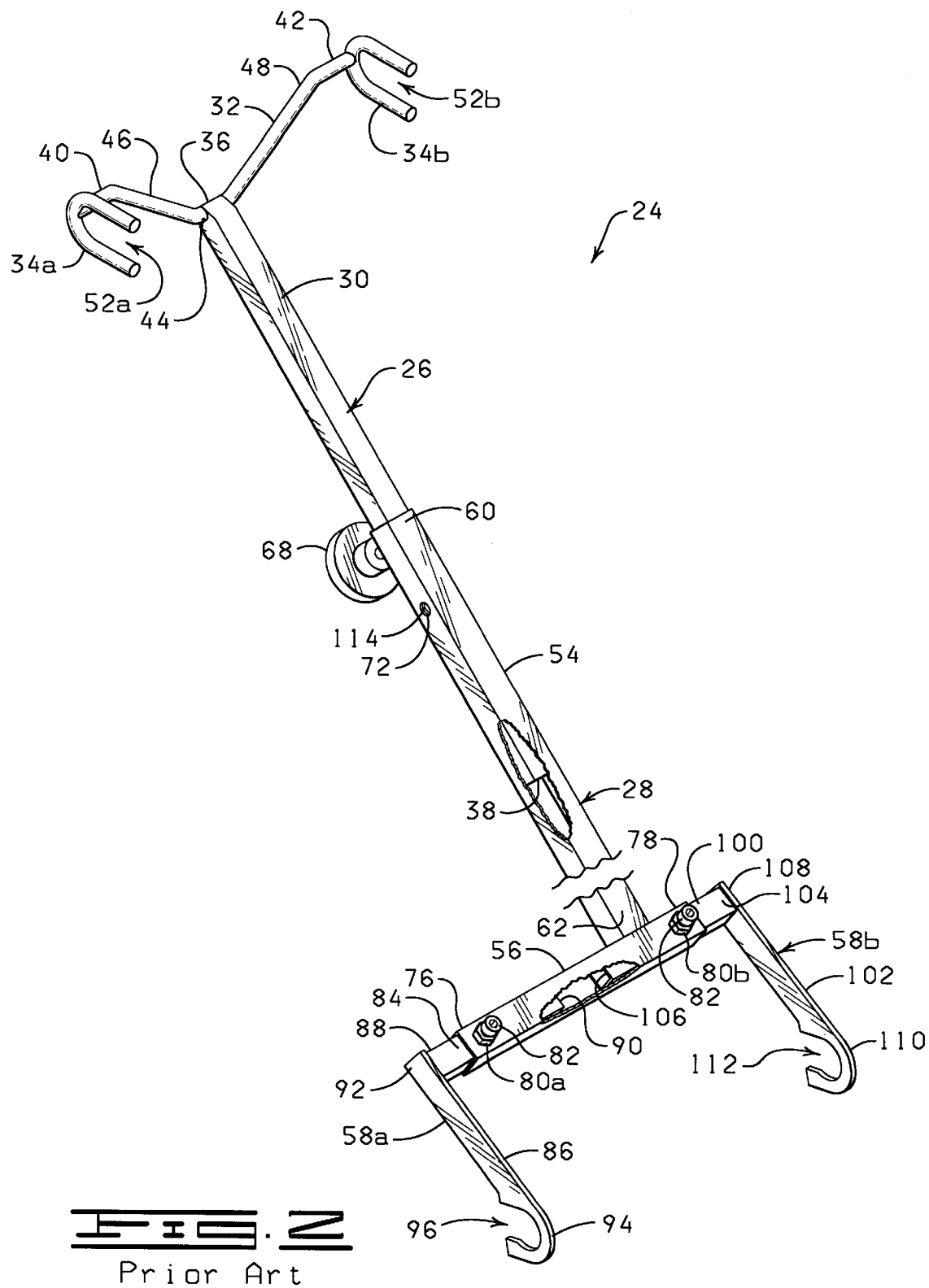

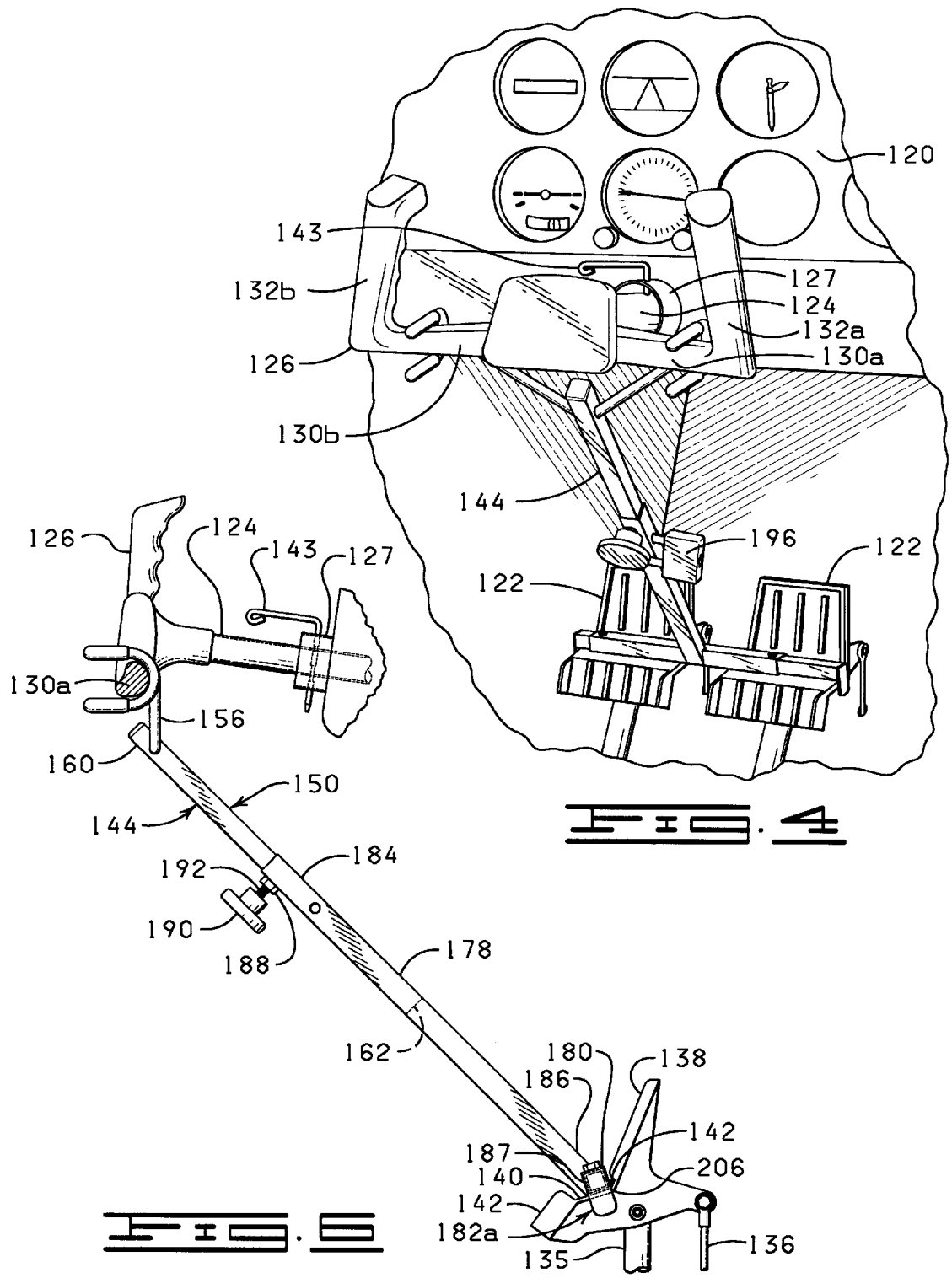

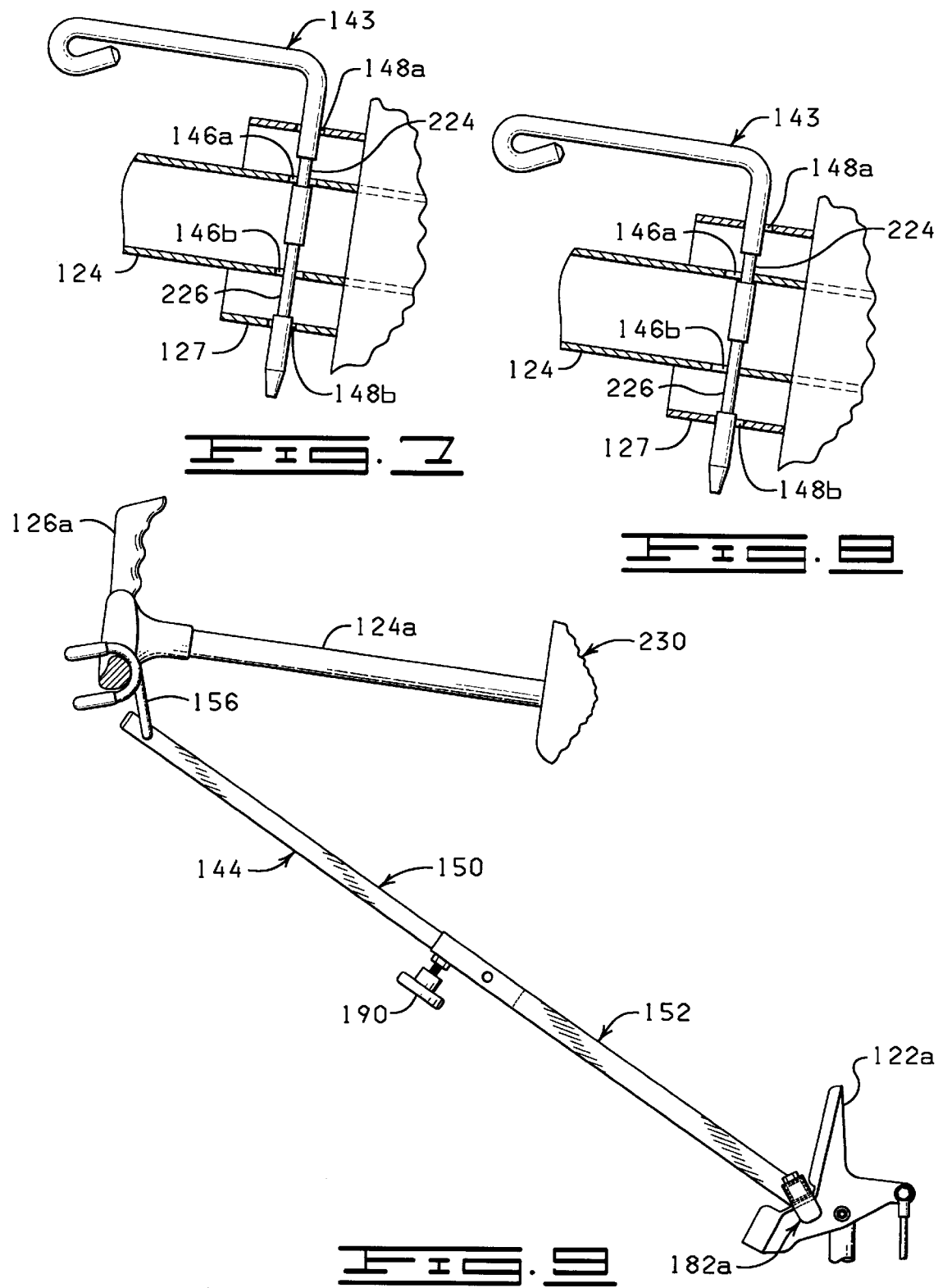

APPARATUS FOR LOCKING AIRCRAFT CONTROLS

CROSS-REFERENCE TO RELATED APPLICATIONS

This application is a continuation-in-part of U.S. Ser. No. 08/653,894, filed May 28, 1996, entitled APPARATUS FOR LOCKING AIRCRAFT CONTROLS, now U.S. Pat. No. 5,713,539.

STATEMENT REGARDING FEDERALLY SPONSORED RESEARCH OR DEVELOPMENT

Not applicable.

BACKGROUND OF THE INVENTION

1. Field of the Invention

The present invention relates generally to locking devices, and more particularly, but not by way of limitation, to an improved apparatus for securing an aircraft against theft and for securing the control surfaces of such aircraft against wind loads by rigidly interlocking the control wheel of the aircraft with the rudder pedals of the aircraft.

2. Description of Related Art

Small aircraft conventionally employ two pedals for controlling the rudder of the aircraft and a control wheel for controlling the aileron and elevator control surfaces of the aircraft. When such aircraft are parked outside, the control surfaces are often subjected to high wind gusts. Gusts of wind can place significant loads on the rudder, the ailerons, and the elevators so as to cause them to flap and crash against their limit stops. Such flapping is undesirable in that it will prematurely wear or damage the control cables and the control linkages.

Additional damage can be incurred to the aircraft as a result of high winds passing over the control surfaces so as to cause all or portions of the aircraft to be lifted from the ground. For example, if the elevators are in an up position, a gust of wind passing over the tail will have a tendency to cause the tail of the aircraft to drop thereby causing the nose of the aircraft to be lifted. Such movement of the aircraft can cause excessive damage to the aircraft, as well as other aircraft parked nearby.

In an attempt to prevent wind damage to the control surfaces of aircraft, various devices have been employed for restricting the movement of the control surfaces when an aircraft is parked. Some of these devices are applied directly to the control surfaces. With the use of these types of devices, pilots have been known to forget to remove the devices before operating the aircraft thus creating a dangerous situation for the pilot. Furthermore, such devices are easily removed from the control surfaces, thus providing the aircraft with little, if any, protection against theft.

Other devices, in the form of elastic straps and cords, have been attached directly to the control wheel in an effort to restrain the movement of the control wheel, and in turn the ailerons and the elevators. Other devices have also been suggested which are attached to both the control wheel and the rudder pedals to restrain the movement of the control wheel and the rudder pedals, and thus the ailerons, the elevators, and the rudder. While such devices have experienced various degrees of success, many of these devices are designed to permit the control wheel, the control column, and the rudder pedals to move through a certain range of motion. As a result, a certain amount of control of the aircraft is still available whereby the aircraft can be taxied and thus stolen.

Other devices have been suggested which rigidly lock the control wheel and the rudder pedals to prevent the control surfaces from moving in gusts of wind. However, the construction and use of such devices results in the control surfaces being positioned in unstable positions, such as the elevators being angled upwardly so as to enable the nose of the aircraft to be lifted off of the ground. In addition, such devices are easily removed and thus do not provide theft deterrence.

To this end, a need has long existed for an improved apparatus is for interlocking the control wheel and rudder pedals of an aircraft to secure the aircraft against theft and to secure the control surfaces of the aircraft against wind loads. It is to such an improved apparatus that the present invention is directed.

BRIEF SUMMARY OF THE INVENTION

The present invention is directed to a locking apparatus in combination with a locking pin and method for rigidly interlocking the control wheel and the rudder pedals of an aircraft, for securing the control surfaces of the aircraft operated by the control wheel and the rudder pedals in a stable position. The locking pin is adapted to be disposed through aligned locking pin receiving holes of the control column and the control panel collar and has a recess formed therein for lockingly receiving a portion of the control column. The apparatus includes a pair of control wheel retaining members rigidly connected to one end of a rod member in a spaced apart, parallel relationship with one another for retainingly engaging opposing radially extending portions of the control wheel and a rudder pedal engaging bar has a linear retaining surface rigidly connected to one end of another rod member. The linear retaining surface is positionable in a V-shaped notch of each of the rudder pedals so as to engage each of the rudder pedals and so as to secure the rudder pedal engaging bar on the rudder pedals. The rod members are disposed in a telescoping relationship with respect to one another and are adjustably securable whereby the control wheel retaining members are rigidly locked in a selected position relative to the rudder pedal retaining bar wherein the control wheel retaining members cooperate with the rudder pedal retaining bar to support the control column in a pin locking position wherein the control column is lockingly disposed in the recess of the locking pin.

The objects, features and advantages of the present invention will become apparent from the following detailed description when read in conjunction with the accompanying drawings and appended claims.

BRIEF DESCRIPTION OF THE SEVERAL VIEWS OF THE DRAWING

FIG. 1 is a perspective view of a portion of an aircraft control panel shown with a locking apparatus constructed in accordance with the present invention secured to the control wheel and the rudder pedals of the aircraft.

FIG. 2 is a partially cutaway, perspective view of the locking apparatus of the present invention.

FIG. 3 is a side view of the locking apparatus of the present invention shown secured to the control wheel and to the rudder pedals.

FIG. 4 is a perspective view of a portion of an aircraft control panel shown with another embodiment of a locking apparatus constructed in accordance with the present invention secured to the control wheel and the rudder pedals of the aircraft.

FIG. 6 is a side view of the locking apparatus of FIG. 4 shown secured to the control wheel and to the rudder pedals.

FIG. 7 is a cross sectional view of the control column and the control panel collar illustrating the locking pin receiving holes of each in alignment.

FIG. 8 is a cross sectional view of the control collar and the control panel collar illustrating the control column in a pin locking position.

FIG. 9 is a side view of the locking apparatus of FIG. 4 shown secured to a control wheel and to the rudder pedals with the control wheel in a fully extended position.

DETAILED DESCRIPTION OF THE INVENTION

Figure 5:
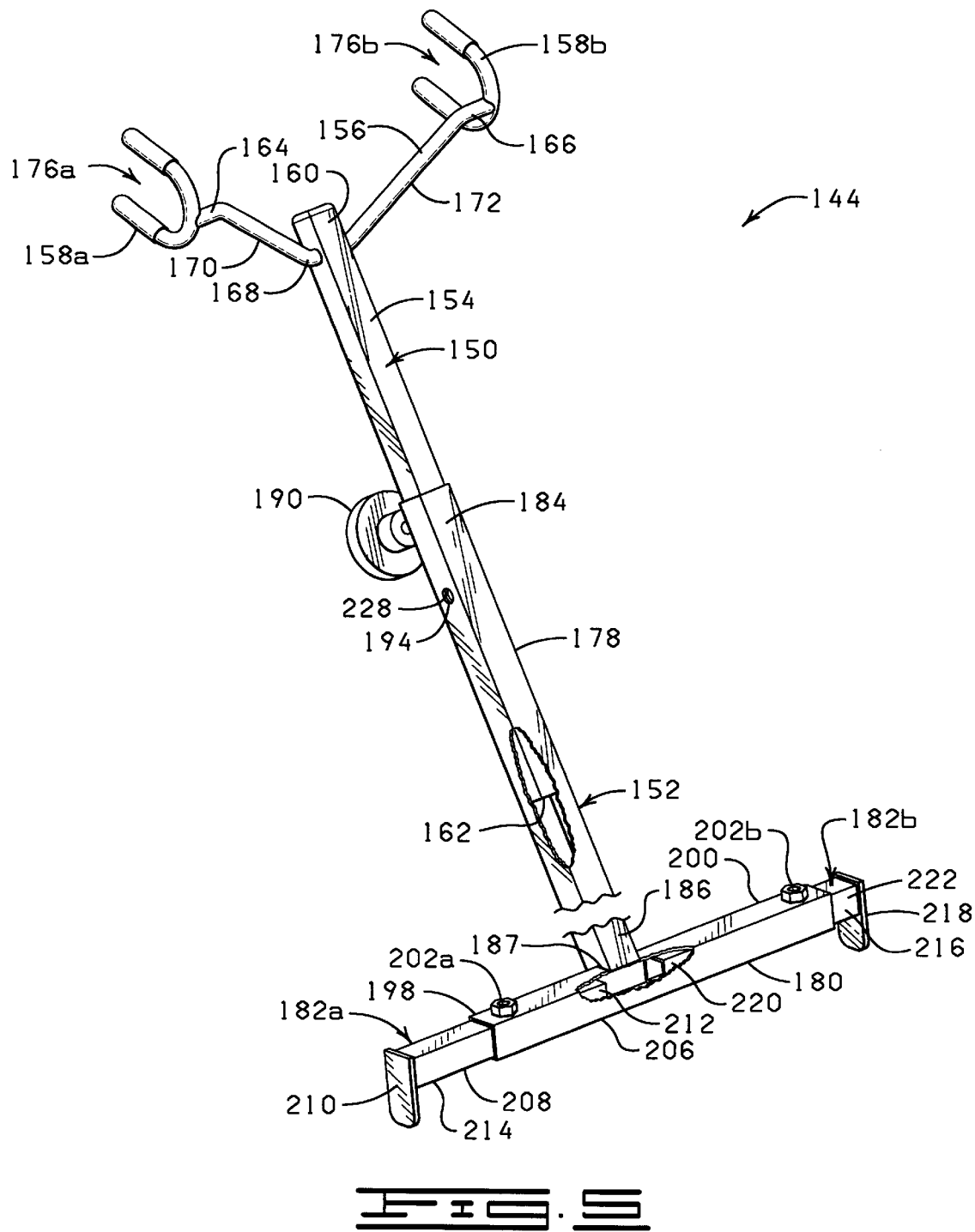
FIG. 5 is a partially cutaway, perspective view of the locking apparatus of FIG. 4
Figure 5:
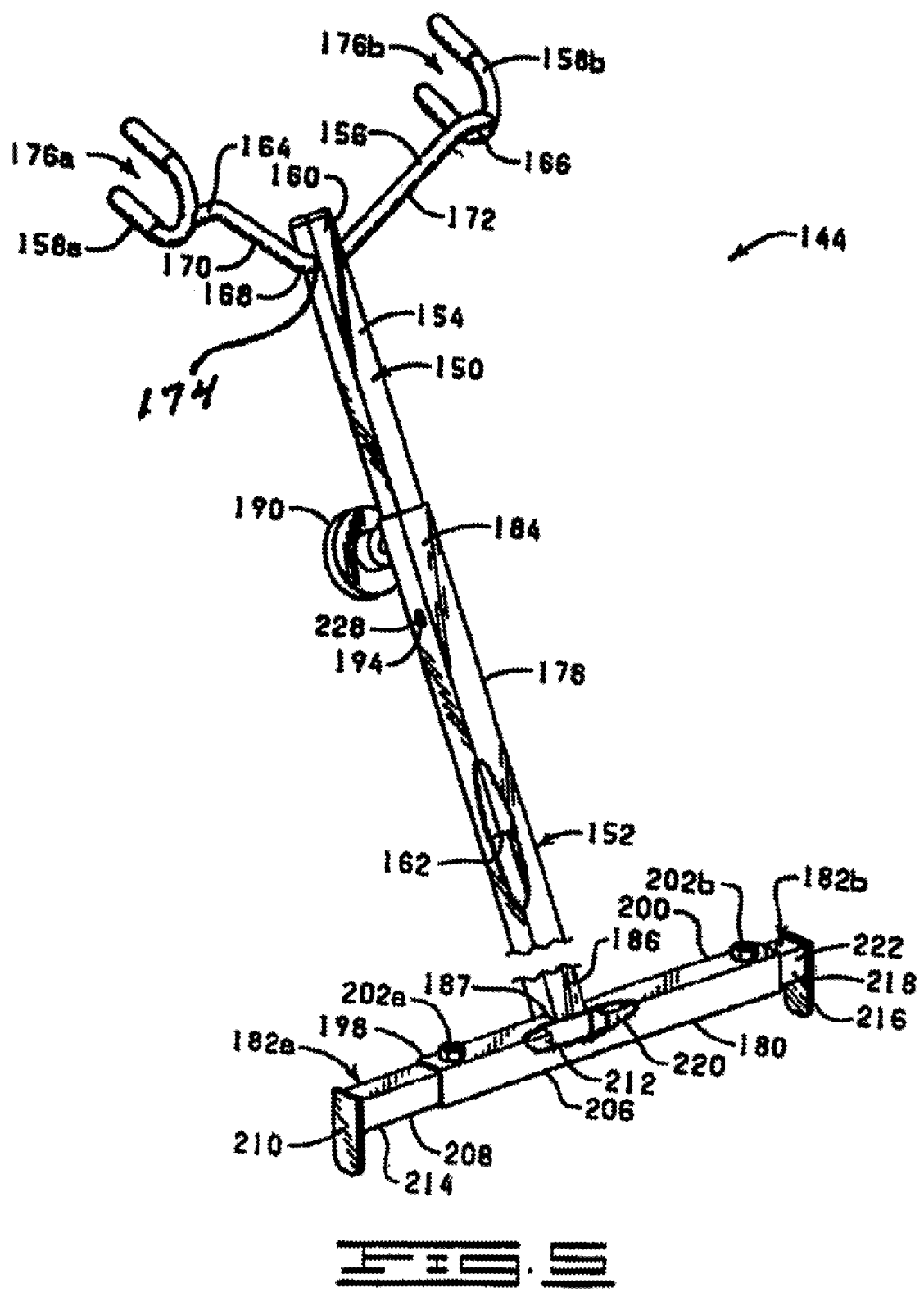

Referring now to the drawings, and more particularly to FIG. 1, shown is a portion of a typical aircraft control panel 10 and a pair of rudder pedals 12 of a typical lightweight aircraft. A control column 14 provided with a control wheel 16 is shown extending from the control panel 10. The control wheel 16 includes a cross member having radially extending portions 20a and 20b, and a pair of grip portions 22a and 22b extending from the ends of the cross member, respectively. The control wheel 16 facilitates movement of the control column 14 in an inward and outward direction to operate the elevators (not shown) and rotation of the control column 14 about a longitudinal axis of the control column 14 to operate the ailerons (not shown) between a level position, a right bank position, and a left bank position.

The rudder pedals 12 operate the rudder (not shown) and each rudder pedal 12 includes a plate member 12a supported by a lever 12b. In many aircraft, a portion 12c of the lever 12b extends laterally from one side of the plate member 12a. The rudder pedals 12 are operable, in a conventional manner, between a neutral or centered position wherein the rudder pedals 12 are in a side-by-side relationship, a right rudder position wherein the right rudder pedal is depressed inwardly relative to the left rudder pedal, and a left rudder position wherein the left rudder pedal is depressed inwardly relative to the right rudder pedal. The rudder pedals 12 may also be pivotable about the lower ends thereof by depressing the top end of the plate member 12a to set a parking brake, if provided.

The control wheel 16 and the rudder pedals 12 are shown in FIG. 1 to be rigidly interlocked with a locking apparatus 24 constructed in accordance with the present invention. The locking apparatus 24 is adapted to interlock the control wheel 16 and the rudder pedals 12 so that the control wheel 16 is retained in a level position wherein the right and left ailerons are substantially level with one another, the control column 14 is retained in an inward position (illustrated in FIG. 1), and the rudder pedals 12 are in a neutral or centered position. With the control wheel 16 secured in the level position, the control column 14 in the inward position, and the rudder pedals 12 in the neutral or centered position, the control surfaces of the aircraft are secured in positions wherein the control surfaces are minimally affected by wind gusts, and what effect the wind does have on the control surfaces will tend to force the aircraft toward the ground rather than lift the aircraft from the ground which, as previously mentioned, can result in substantial damage to the aircraft, as well as nearby aircraft. More specifically, with the control column 14 in the inward position, the elevators are set in a downwardly angled position which will result in an upwardly directed force on the tail of the aircraft when a strong gust of wind passes over the tail. Such a force on the tail will in turn cause the nose of the aircraft to be forced downward so as to maintain the aircraft in stable contact with the ground.

The control wheel 16, the control column 14 and the rudder pedals 12 are conventional components of most small lightweight airplanes, and the operation of such components is well known to persons familiar with piloting such aircraft. Thus, no further description of such components or the operation of such components is believed necessary to enable one to fully understand the present invention which will now be described in detail.

Referring now to FIGS. 2 and 3, the locking apparatus 24 includes a control wheel support assembly 26 and a rudder pedal support assembly 28 disposed in a longitudinally adjustable, telescoping relationship with respect to one another whereby the control wheel support assembly 26 is rigidly lockable in a selected position relative to the rudder pedal support assembly 28 so that the control wheel support assembly 26 cooperates with the rudder pedal support assembly 28 to secure the control wheel 16 in the level position, the control column 14 in the inward position, and the rudder pedals 12 in the neutral or centered position.

The control wheel support assembly 26 includes an extension rod 30, a control wheel cross bar 32, and a pair of control wheel retaining members 34a and 34b. The extension rod 30 is an elongated member having a first end 36 and a second end 38. The extension rod 30 is preferably constructed of a square-shaped, steel tubing, but the extension rod 30 may be constructed of any rigid, high strength material preferably having a non-circular shape for reasons that will be explained below.

The control wheel cross bar 32 is characterized as having a first end portion 40, a second end portion 42, and a medial portion 44. The cross bar 32 is provided with a plurality of bends thereby forming a first leg 46 between the medial portion 44 and the first end portion 40 and a second leg 48 between the medial portion 44 and the second end portion 42 so that the first and second end portions 40 and 42 are offset from the medial portion 44 in a parallel relationship. Further, the bends of the cross bar 32 are oriented so that the medial portion 44, the first and second legs 46 and 48, and the first and second end portions 40 and 42 extend in a common plane.

The cross bar 32 is secured to the first end 36 of the extension rod 30 by disposing the medial portion 44 of the cross bar 32 in a slot (not shown) formed across the first end 36 of the extension rod 30 for receiving the cross bar 32 and then connecting the cross bar 32 to the extension rod 30 in a suitable manner, such as by welding. The cross bar 32 is secured to the extension rod 30 so that the first and second end portions 40 and 42 of the cross bar 32 extend outwardly from the first end 36 of the extension rod 30 and so that the cross bar 32 is angularly disposed relative to a longitudinal axis of the extension rod 30 at an angle 50 (FIG. 3). The angle 50 is shown herein to be about 45 degrees; however, it will be appreciated that the angle 50 may be varied to accommodate the particular shape and dimensions of the control wheel and the instrument panel of different aircraft.

The control wheel retaining members 34a and 34b are substantially U-shaped members, each defining a wheel receiving space 52a and 52b, respectively. The wheel receiving spaces 52a and 52b are sized to retainingly receive the radially extending portions 20a and 20b of the control wheel 16. The control wheel retaining member 34a is connected to the first end portion 40 of the cross bar 32, and the control wheel retaining member 34b is connected to the second end portion 42 of the cross bar 32 such that the control wheel retaining member 34a is in a spaced apart, parallel relationship with respect to the control wheel retaining member 34b for retaining opposing portions of the control wheel 16. The control wheel retaining members 34a and 34b are connected to the first and second end portions 40 and 42 of the cross bar 32, respectively, so that the control wheel retaining members 34a and 34b are normally disposed relative to the cross bar 32 with the open ends of the control wheel retaining members 34a and 34b oriented generally toward the second end 38 of the extension rod 30, as best shown in FIG. 3. To prevent damage to the control wheel 16, the control wheel retaining members 34a and 34b may be coated with a non-abrasive material, such as rubber or some other suitable material.

The rudder pedal support assembly 28 is adapted to be adjustably secured to the control wheel support assembly 26 and retainingly engage the laterally extending portions 12c of each of the rudder pedals 12. The rudder pedal support assembly 28 includes a support rod 54, a rudder cross bar 56, and a pair of rudder pedal retaining assemblies 58a and 58b. The support rod 54 is an elongated member characterized as having a first end 60 and a second end 62. The first end 60 of the support rod 54 is open and the support rod 54 is constructed of a square, steel tubing dimensioned to matingly receive the extension rod 30 of the control wheel support assembly 26 such that the extension rod 30 and the support rod 54 are disposed in a non-rotatable, telescoping relationship with one another. It will be appreciated that the support rod 54, like the extension rod 30, may be constructed of any suitable rigid and high strength material having a shape slidably matable with the extension rod 30. The second end of the support rod 54 is formed at an angle 64 (FIG. 3).

To permit the extension rod 30 to be adjustably set in a selected position relative to the support rod 54, the support rod 54 is provided with a threaded bore 66 through the sidewall thereof which is adapted to receive a clamp knob 68 having a threaded shaft 70 which is grippingly engagable with the side of the extension rod 30. The support rod 54 is also provided with a lock receiving opening 72 which extends across the support rod 54 and is dimensioned to receive a locking mechanism, such as a pad lock 74 as shown in FIG. 1.

The rudder cross bar 56 is constructed of a square, steel tubing so as to have a first open end 76 and a second open end 78. The rudder cross bar 56 is provided with a pair of threaded openings 80a and 80b, each positioned proximate the first and second open ends 76 and 78, respectively, for threadingly receiving a securing device, such as a cap screw 82.

The rudder cross bar 56 is connected to the second end 62 of the support rod 54 so that the rudder cross bar 56 is normally disposed relative to the support rod 54. In addition, because the rudder pedal support assembly 28 is configured to engage the laterally extending portions 12c of each of the rudder pedals 12, as opposed to the plates 12a thereof, and because the control wheel 16 and the control column 14 are generally aligned with a centerline of the plates 12a of the rudder pedals 12 while the laterally extending portions 12c of the rudder pedals 12 are laterally offset from the control wheel 16 and the control column 14, the rudder cross bar 56 is connected to the support rod 54 at a location on the rudder cross bar 56 located between the first end 76 and the second end 78 of the rudder cross bar 56 which is laterally offset from the center of the rudder cross bar 56. As best shown in FIG. 3, the angled configuration of the second end 62 of the support rod 54 facilitates the positioning of the rudder cross bar 56 in an angular relationship relative to the longitudinal axis of the support rod 54 when the rudder cross bar 56 is connected to the support rod 54. It will be appreciated that the angle 64 may be varied to accommodate the particular shape and dimensions of the control wheel and the instrument panel, as well as the relative position of the rudder pedals 12 to the control wheel and instrument panel of a particular aircraft.

The rudder pedal retaining assembly 58a includes an insert tube 84 and a rudder pedal retaining member 86. The insert tube 84 is constructed of a square tube sized so that the insert tube 84 is slidingly received in the first open end 76 of the rudder cross bar 56 in a telescoping relationship therewith. The insert tube 84 is characterized as having a first end 88 and a second end 90.

The rudder pedal retaining member 86 is constructed of a relatively flat steel bar having a first end 92 connected to the first end 88 of the insert tube 84 so that the rudder pedal retaining member 86 is normally disposed relative to the insert tube 84 and so that the rudder pedal retaining member 86 will extend upwardly from the longitudinal axis of the support rod 54 at the angle 64 when the rudder pedal retaining member 86 is disposed in the insert tube 84. The rudder pedal retaining member 86 further includes a hook portion 94 for retainingly engaging the laterally extending portion 12c of right rudder pedal 12. The hook portion 94 of the rudder pedal retaining member 86 has a substantially U-shaped configuration defining a lever receiving space 96. The lever receiving space 96 is sized to retainingly receive the laterally extending portion 12c of the rudder pedal 12, substantially as shown in FIG. 3. The hook portion 94 is formed on the rudder pedal retaining member 86 so that a centerline 98 extending from the open end of the hook portion 94 extends downwardly from the longitudinal axis of the rudder pedal retaining member 86 and generally toward the first end 92 of the rudder pedal retaining member 86 so that control wheel retaining members 34a and 34b and the hook portion 94 are oriented in substantially opposing directions when the control wheel support assembly 26 and the rudder pedal support assembly 28 are assembled.

Like the rudder pedal retaining assembly 58a, the rudder pedal retaining assembly 58b includes an insert tube 100 and a rudder pedal retaining member 102. The insert tube 100 is constructed of a square tube sized so that the insert tube 100 is slidingly received in the second open end 78 of the rudder cross bar 56 in a telescoping relationship therewith. The insert tube 100 is characterized as having a first end 104 and a second end 106.

The rudder pedal retaining member 102 is constructed of a relatively flat steel bar having a first end 108 connected to the first end 104 of the insert tube 100 so that the rudder pedal retaining member 102 is normally disposed relative to the insert tube 100 and so that the rudder pedal retaining member 102 will extend upwardly from the longitudinal axis of the support rod 54 at the angle 64 when the rudder pedal retaining member 102 is disposed in the insert tube 100. The rudder pedal retaining member 102 further includes a hook portion 110 for retainingly engaging the laterally extending portion 12c of the left rudder pedal 12. The hook portion 110 of the rudder pedal retaining member 102 has a substantially U-shaped configuration defining a lever receiving space 112. The lever receiving space 112 is sized to retainingly receive the laterally extending portion 12c of the rudder pedal 12. The hook portion 110 is formed on the rudder pedal retaining member 102 such that the centerline extending from the open end of the hook portion 110 extends downwardly from the longitudinal axis of the rudder pedal retaining member 102 and generally toward the first end 108 of the rudder pedal retaining member 102 so that control wheel retaining members 34a and 34b and the hook portion 110 are oriented in substantially opposing directions when the control wheel support assembly 26 and the rudder pedal support assembly 28 are assembled.

When the insert tubes 84 and 100 are disposed in the first and second open ends 76 and 78 of the cross bar 56, respectively, the rudder pedal retaining members 86 and 102 extend upwardly from the longitudinal axis of the support rod 54 at the angle 64 in a spaced apart, parallel relationship. Furthermore, with the control wheel support assembly 26 assembled with the rudder pedal support assembly 28, the hook portions 94 and 110 of the rudder pedal retaining members 86 and 102, respectively, are oriented relative to the control wheel retaining members 34a and 34b so that the rudder pedal retaining members 86 and 102 cooperate with the control wheel retaining members 34a and 34b to secure the locking apparatus 24 on the control wheel 16 and the rudder pedals 12 when the control column 14 is in the inward position and the rudder pedals 12 are in the neutral or centered position.

Operation

In operation, the rudder pedal retaining assemblies 58a and 58b are adjusted so that each of the hook portions 94 and 110 are properly spaced apart to fit over the corresponding laterally extending portion 12c of the rudder pedal 12 when the extension rod 30 and the support rod 54 are generally aligned with the control column 14. With the rudder pedal retaining members 86 and 102 properly spaced, the cap screws 82 are tightened to secure the rudder pedal retaining assemblies 58a and 58b in place. Next, the hook portions 94 and 110 of the rudder pedal retaining members 86 and 102 are positioned on the respective laterally extending portions 12c of the rudder pedals 12. The control column 14 is then pushed to the inward position so as move the elevator control surfaces to a downward angled position. With the control column 14 in the inward position, the control wheel support assembly 26 is extended relative to the rudder pedal support assembly 28 so that the control wheel retaining members 34a and 34b are positioned out in front of the control wheel 16. The control wheel support assembly 26 is then retracted so as to position the control wheel retaining members 34a and 34b on the control wheel 16 such that opposing radially extending portions 20a and 20b of the control wheel 16 are positioned in the control wheel receiving spaces 52a and 52b, respectively. When the control wheel retaining members 34a and 34b are positioned on the control wheel 16 with the rudder pedal retaining members 86 and 102 positioned on the rudder pedals 12 and the control column 14 in the inward position, the control wheel support assembly 26 is secured relative to the rudder pedal support assembly 28 by tightening the clamp knob 68 against the extension rod 30 of the control wheel support assembly 26, thereby rigidly interlocking the extension rod 30 with the support rod 54 so that the control wheel retaining members 34a and 34b cooperate with the rudder pedal retaining members 86 and 102 to secure the control wheel 16 in the level position with the control column 14 in the inward position and the rudder pedals 12 in the neutral or centered position.

To enable the locking apparatus 24 to be secured on the aircraft so as to protect the aircraft against theft, a lock receiving hole 114 (FIG. 2) is formed through the extension rod 30 so that the lock receiving hole 114 is aligned with the lock receiving opening 72 of the support rod 54 when the locking apparatus 24 is secured on the control wheel 16 and the rudder pedals 12. With the locking apparatus 24 secured on the control wheel 16 and the rudder pedals 12, the shackle of the pad lock 74 is inserted through the aligned lock receiving openings 72 and 114, and the pad lock 74 is locked thereby locking the locking apparatus 24 to the control wheel 16 and the rudder pedals 12.

Referring now to FIG. 4, shown is a portion of an aircraft control panel 120 and a pair of rudder pedals 122 of another typical lightweight aircraft. A control column 124 provided with a control wheel 126 is shown extending from a collar 127 of the control panel 120. The control wheel 126 includes a cross member having radially extending portions 130a and 130b, and a pair of grip portions 132a and 132b extending from the ends of the cross member 128, respectively. As previously described, the control wheel 126 facilitates movement of the control column 124 in an inward and outward direction to operate the elevators (not shown) and rotation of the control column 124 about a longitudinal axis of the control column 124 to operate the ailerons (not shown) between a level position, a right bank position, and a left bank position.

The rudder pedals 122 operate the rudder (not shown), and (as illustrated in FIG. 6) each rudder pedal 122 is supported by a pair of levers 135 and 136 and includes an upper treaded portion 138, an intermediate portion 140, and a lower portion 141 forming a series of angled surfaces with the upper portion 138 and the intermediate portion 140 cooperating to form a V-shaped notch 142 (FIG. 6).

The rudder pedals 122 are operable in a conventional manner between a neutral or centered position wherein the rudder pedals 122 are in a side-by-side relationship, a right rudder position wherein the right rudder pedal is depressed inwardly relative to the left rudder pedal, and a left rudder position wherein the left rudder pedal is depressed inwardly relative to the right rudder pedal. In addition, the upper portion 138 of each of the rudder pedals 122 may be simultaneously depressed to set a parking brake via the levers 136.

The control wheel 126 and the rudder pedals 122 are shown in FIG. 4 to be rigidly interlocked with a locking kit which includes a locking pin 143 and a locking apparatus 144, each constructed in accordance with the present invention. It will be appreciated by those of ordinary skill in the art that the use of locking pins are well known in the art for interlocking the control column 124 to the control panel collar 127. That is, in certain makes of aircraft, in particular certain aircraft manufactured by Cessna, the control column 124 is provided with a pair of diametrically opposed holes 146a and 146b (FIGS. 7 and 8) which are intended to be matingly aligned with a pair of diametrically opposed holes 148a, 148b of the collar 127 (FIGS. 7 and 8) when the control column 124 is generally in the inward position. The locking pin is inserted through aligned holes, thereby rigidly interlocking the control column 124 to the control panel collar 127.

While the use of locking pins has been beneficial for securing the elevators and the ailerons against wind loads, prior art locking pins do not secure the rudder pedals and thus the rudder against wind loads. Furthermore, conventional locking pins are easily removed from the control panel collar, thus providing the aircraft with little, if any, protection against theft.

The locking pin 143 and the locking apparatus 144 are adapted to cooperate to interlock the control wheel 126 and the rudder pedals 122 so that the control wheel 126 is retained in a level position wherein the right and left ailerons are substantially level with one another, the control column 124 is retained in an inward position (illustrated in FIG. 4), and the rudder pedals 122 are in a neutral or centered position, as well as lockingly secure the locking pin 143 in the control column 124 and the control panel collar 127 so as to prevent unauthorized removal of the locking pin 143. With the control wheel 126 secured in the level position, the control column 124 in the inward position, and the rudder pedals 122 in the neutral or centered position, the control surfaces of the aircraft are secured in positions wherein the control surfaces are minimally affected by wind gusts, and what effect the wind does have on the control surfaces, will tend to force the aircraft toward the ground rather than lift the aircraft from the ground which, as previously mentioned, can result in substantial damage to the aircraft, as well as nearby aircraft. More specifically, with the control column 124 in the inward position, the elevators are set in a downwardly angled position which will result in an upwardly directed force on the tail of the aircraft when a strong gust of wind passes over the tail. Such a force on the tail will in turn cause the nose of the aircraft to be forced downward so as to maintain the aircraft in stable contact with the ground.

The control wheel 126, the control column 124, and the rudder pedals 122 are conventional components of most small lightweight airplanes, and the operation of such components is well known to persons familiar with piloting such aircraft. Thus, no further description of such components or the operation of such components is believed necessary to enable one to fully understand the present invention which will now be described in detail.

Referring now to FIGS. 5 and 6, the locking apparatus 144 includes a control wheel support assembly 150 and a rudder pedal support assembly 152 disposed in a longitudinally adjustable, telescoping relationship with respect to one another whereby the control wheel support assembly 150 is rigidly lockable in a selected position relative to the rudder pedal support assembly 152 so that the control wheel support assembly 150 cooperates with the rudder pedal support assembly 152 to secure the rudder pedals 122 in the neutral or centered position and to support the control column 124 relative to the collar 127 in a pin locking position to lockingly secure the locking pin 143 in the holes 146a, 146b of the control column 124 and holes 148a, 148b of the control panel collar 127.

The control wheel support assembly 150 includes an extension rod 154, a control wheel cross bar 156, and a pair of control wheel retaining members 158a and 158b. The extension rod 154 is an elongated member having a first end 160 and a second end 162. The extension rod 154 is preferably constructed of a square-shaped steel tubing, but the extension rod 154 may be constructed of any rigid, high strength material preferably having a non-circular shape for reasons that will be explained below.

The control wheel cross bar 156 is characterized as having a first end portion 164, a second end portion 166, and a medial portion 168. The cross bar 156 is provided with a plurality of bends thereby forming a first leg 170 between the medial portion 168 and the first end portion 164 and a second leg 172 between the medial portion 168 and the second end portion 166 so that the first and second end portions 164 and 166 are offset from the medial portion 168 in a parallel relationship. Further, the bends of the cross bar 156 are oriented so that the medial portion 168, the first and second legs 170 and 172, and the first and second end portions 164 and 166 extend in a common plane.

The cross bar 156 is secured to the first end 160 of the extension rod 154 by positioning the cross bar 156 through a hole provided in the first end 160 of the extension rod 154 for receiving the cross bar 156 and then securing the cross bar 156 to the extension rod 154 in a suitable manner, such as by welding. The cross bar 156 is secured to the extension rod 154 so that the first and second end portions 164 and 166 of the cross bar 156 extend outwardly from the first end 160 of the extension rod 154 and so that the cross bar 156 is angularly disposed relative to a longitudinal axis of the extension rod 154 at an angle of about 45°; however, it will be appreciated that the angle may be varied to accommodate the particular shape and dimensions of the control wheel and the instrument panel of different aircraft.

The control wheel retaining members 158a and 158b are substantially U-shaped members, each defining a wheel receiving space 176a and 176b, respectively. The wheel receiving spaces 176a and 176b are sized to retainingly receive the radially extending portions 130a and 130b of the control wheel 126. The control wheel retaining member 158a is connected to the first end portion 164 of the cross bar 156, and the control wheel retaining member 158b is connected to the second end portion 166 of the cross bar 156 such that the control wheel retaining member 158a is in a spaced apart, parallel relationship with respect to the control wheel retaining member 158b for retaining opposing portions of the control wheel 126. The control wheel retaining members 158a and 158b are connected to the first and second end portions 164 and 166 of the cross bar 156, respectively, so that the control wheel retaining members 158a and 158b are normally disposed relative to the cross bar 156 with the open ends of the control wheel retaining members 158a and 158b oriented generally away from the extension rod 154. To prevent damage to the control wheel 126, the control wheel retaining members 158a and 158b may be coated with a non-abrasive material, such as rubber or some other suitable material.

The rudder pedal support assembly 152 is adapted to be adjustably secured to the control wheel support assembly 150 and retainingly engage each of the rudder pedals 122. The rudder pedal support assembly 152 includes a support rod 178, a rudder pedal engaging bar 180, and a pair of rudder pedal engaging bar extension assemblies 182a and 182b.

The support rod 178 is an elongated member characterized as having a first end 184 and a second end 186. The first end 184 of the support rod 178 is open and the support rod 178 is constructed of a square steel tubing dimensioned to matingly receive the extension rod 154 of the control wheel support assembly 150 such that the extension rod 154 and the support rod 178 are disposed in a non-rotatable, telescoping relationship with one another. It will be appreciated that the support rod 178, like the extension rod 154, may be constructed of any suitable rigid and high strength material having a shape slidably matable with the extension rod 154. The second end 186 of the support rod 178 is provided with a notch 187 for receiving the rudder pedal engaging bar 180.

To permit the extension rod 154 to be adjusted to a selected position relative to the support rod 178, the support rod 178 is provided with a threaded bore 188 through the sidewall thereof which is adapted to receive a clamp knob 190 having a threaded shaft 192 which is grippingly engagable with the side of the extension rod 154. The support rod 178 is also provided with a lock receiving opening 194 which extends through opposing sides of the support rod 178 and is dimensioned to receive a locking mechanism, such as a pad lock 196 as shown in FIG. 4.

The rudder pedal engaging bar 180 is constructed of a square steel tubing so as to have a first open end 198 and a second open end 200. The rudder pedal engaging bar 180 is provided with a pair of threaded openings 202a and 202b, each positioned proximate the first and second open ends 198 and 200, respectively, for threadingly receiving a securing device, such as an allen screw (not shown).

The rudder pedal engaging bar 180 is secured in the notch 187 formed in the second end 186 of the support rod 178 so that the longitudinal axis of the rudder pedal engaging bar 180 is normally disposed relative to the longitudinal axis of the support rod 178. The rudder pedal engaging bar 180 is skewed relative to the support rod 178 so as to provide a linear retaining surface 206 that is positionable in the V-shaped notch 142 formed by the upper portion 138 and the intermediate portion 140 of each of the rudder pedals 122 when the locking apparatus 144 is operably secured between the rudder pedals 122 and the control wheel 126 such that the retaining surface 206 engages each of the rudder pedals 122 and is secured in the V-shaped notch 142. It will be appreciated that the angular position of the rudder pedal engaging bar 180 relative to the support rod 178 may be varied to accommodate the particular shape and dimensions of the control wheel and the instrument panel, as well as the relative position of the rudder pedals to the control wheel and control panel of a particular aircraft.

The rudder pedal engaging bar extension assembly 182a includes an insert tube 208 and a side arm 210. The insert tube 208 is constructed of a square tube sized so that the insert tube 208 is slidingly received in the first open end 198 of the rudder pedal engaging bar 180 in a telescoping relationship therewith. The insert tube 208 is characterized as having a first end 212 and a second end 214.

The side arm 210 is constructed of a relatively flat steel bar and connected to the first end 212 of the insert tube 208 so that the side arm 210 is normally disposed relative to the insert tube 208 and so that the side arm 210 is extendable over the outer edge of the adjacent rudder pedal 122 when the retaining surface 206 of the rudder pedal engaging bar 180 is positioned in the V-shaped notch 142 of each of the rudder pedals 122.

Like the rudder pedal engaging bar extension assembly 182a, the rudder pedal engaging bar extension assembly 182b includes an insert tube 216 and a side arm 218. The insert tube 216 is constructed of a square tube sized so that the insert tube 216 is slidingly received in the second open end 200 of the rudder pedal engaging bar 180 in a telescoping relationship therewith. The insert tube 216 is characterized as having a first end 220 and a second end 222.

The side arm 218 is constructed of a relatively flat steel bar and connected to the first end 220 of the insert tube 216 so that the side arm 218 is normally disposed relative to the insert tube 216 and so that the side arm 218 is extendable over the outer edge of the adjacent rudder pedal 122 when the retaining surface 206 of the rudder pedal engaging bar 180 is positioned in the V-shaped notch 142 of each of the rudder pedals 122. The side arms 210 and 218 cooperate to stabilize the rudder pedal engaging bar 180 on the rudder pedals 122 by preventing the rudder pedal engaging bar 180 from being laterally dislodged from the rudder pedals 122 by kicking or knocking the locking apparatus 144 in a direction parallel to the longitudinal axis of the rudder pedal engaging bar 180.

Referring now to FIGS. 7 and 8, the locking pin 143 is provided with a pair of spaced apart, annular recesses 224 and 226 to prevent the locking pin 143 from being removed from the control column 124 and the control panel collar 127 by unauthorized persons. More specifically, the recesses 224 and 226 are spaced apart and configured so that each recess 224 and 226 is adapted to receive opposing portions of the control column 124 when the locking pin 143 is positioned through the holes 146a and 146b of the control column 124 and the holes 148a and 148b of the control panel collar 127 and the holes 146a and 146b are offset relative to the holes 148a and 148b in a pin locking position, as shown in FIG. 8, such that the control column 124 is lockingly disposed in the recesses 224 and 226.

The recess 226 is shown herein to have a length greater than the length of the recess 224. This permits the locking pin 143 to be employed with various sized control columns 124 and control panel collars 127. It will be appreciated that a single recess dimensioned to receive opposing sides 224 and 226 of the control column 124 will function to secure the locking pin 143 in the control panel collar 127 and the control column 124, as will a pair of recesses formed to receive opposing sides of the control panel collar 127.

Operation

In operation, the rudder pedals 122 are first placed in the neutral or centered position. The rudder pedal engaging bar extension assemblies 182a and 182b are then extended outwardly to enable the side arms 210 and 218 to clear the outer sides of the respective rudder pedals 122. The retaining surface 206 of the rudder pedal engaging bar 180 is next positioned in the V-shaped notch 142 of the rudder pedals 122 so that the extension rod 154 and the support rod 178 are generally aligned with the control column 124 along a vertical plane extending therethrough. The insert tubes 208 and 216 are then slid inwardly until the side arms 210 and 218 engage the outer side of the respective rudder pedals 122. With the side arms 210 and 218 properly spaced, the allen screws (not shown) are tightened to secure the rudder pedal engaging bar extension assemblies 182a and 182b in place.

The control column 124 is next moved to align the holes 146a, 146b of the control column 124 with the holes 148a, 148b of the control panel collar 127 and the locking pin 143 is inserted through the aligned holes (FIG. 7). The control wheel support assembly 150 is then extended relative to the rudder pedal support assembly 152 so that the control wheel retaining members 158a and 158b are positioned on the back side of the control wheel 126 with opposing radially extending portions 130a and 130b of the control wheel 126 positioned in the control wheel receiving spaces 176a and 176b, respectively.

A light pressure is then simultaneously applied to each of the rudder pedals 122 to remove any play in the rudder pedals 122 while pulling back on the control wheel support assembly 150 to move the control column 124 to the pin locking position (FIG. 8) wherein the holes 146a and 146b of the control column 124 are offset relative to the holes 148a and 148b of the control panel collar 127 so that the control column 124 is lockingly received in the recesses 224 and 226 of the locking pin 143. When the control wheel retaining members 158a and 158b are positioned on and engaged against the control wheel 126 with the rudder pedal engaging bar 180 positioned on the rudder pedals 122, the control wheel support assembly 150 is secured relative to the rudder pedal support assembly 152 by tightening the clamp knob 190 against the extension rod 154 of the control wheel support assembly 150, thereby rigidly interlocking the extension rod 154 with the support rod 178 so that the locking apparatus 144 cooperates with the locking pin 143 to secure the control wheel 126 in the level position with the control column 124 in the inward position and the rudder pedals 122 in the neutral or centered position.

To enable the locking apparatus 144 to be secured on the aircraft so as to protect the aircraft against theft, a lock receiving hole 228 (FIG. 5) is formed through the extension rod 154 so that the lock receiving hole 228 is aligned with the lock receiving opening 194 of the support rod 178 when the locking apparatus 144 is secured on the control wheel 126 and the rudder pedals 122. With the locking apparatus 144 secured on the control wheel 126 and the rudder pedals 122, the shackle of the pad lock 196 is inserted through the aligned lock receiving openings 194 and 228, and the pad lock 196 is locked thereby locking the locking apparatus 144 to the control wheel 126 and the rudder pedals 122 and securing the locking pin 143 in the control column 124 to the control panel collar 127.

FIG. 9 illustrates the locking apparatus 144 employed with a type of small aircraft 230 commonly referred to as a "tail dragger" in that a portion of the landing gear includes a wheel extending downward from the tail of the aircraft. In the case of aircraft of this type it is preferable that the elevators be positioned in an upward position when the aircraft is parked so that any wind acting on the aircraft will have a tendency to force the tail toward the ground so as to maintain the aircraft in stable contact with the ground rather than lift the tail from the ground which can result in substantial damage to the aircraft. To position the elevators in an upwardly angled position, the control column is moved to the outward position, as illustrated in FIG. 9.

It will be appreciated that the locking apparatus 144 is installed on the aircraft 230 in a manner identical to that described above in reference to FIGS. 4–8 with the exception that the control wheel support assembly 150 is pulled backed to position the control column 124 in a full outward position. As such, the locking apparatus 144 serves to secure the control wheel 126 in the level position, the control column 124 in the outward position, and the rudder pedals 122 in the neutral or centered position. In this instance, with the control column 124 in the full outward position, the locking apparatus 144 need not be used in combination with the locking pin 143.

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

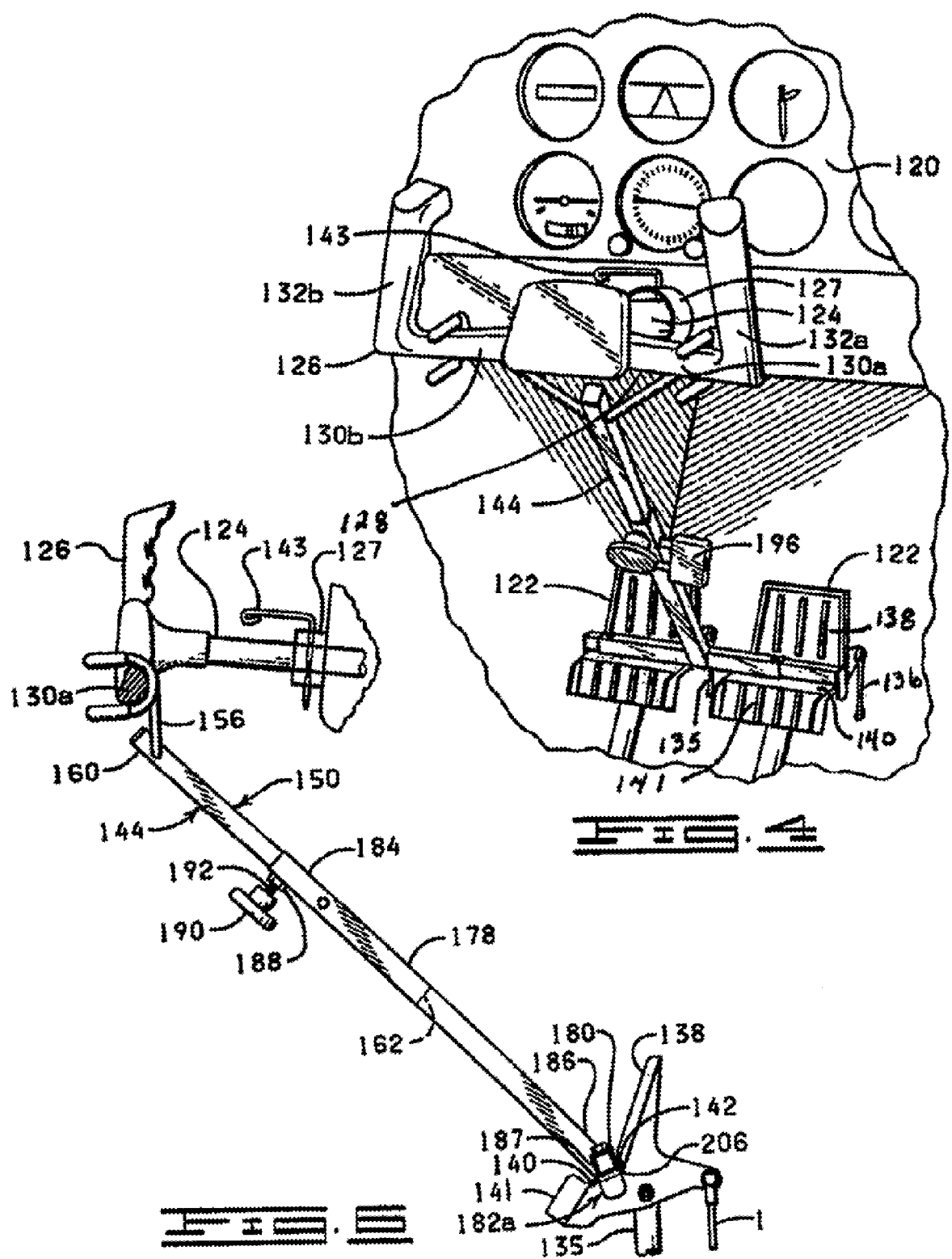

What is claimed:

1. An apparatus for rigidly interlocking a control wheel and a pair of rudder pedals of an aircraft to secure the control surfaces of the aircraft operated by the control wheel and the rudder pedals in a stable position, the control wheel connected to a control column adapted for rotation about a longitudinal axis thereof to operate the aileron control surfaces of the aircraft between a level position, a right bank position, and a left bank position and adapted for reciprocating movement between an inward position and an outward position along the longitudinal axis of the control column to operate the elevator control surfaces of the aircraft, each of the rudder pedals having a pair of angled portions forming a substantially V-shaped notch and movable between a neutral position and a depressed position to operate the rudder control surface of the aircraft, the apparatus comprising:

a first rod member having a first end and a second end;

a second rod member having a first end and a second end, the second rod member disposed in a telescoping relationship with respect to the first rod member;

a control wheel engaging member rigidly connected to the first end of the first rod member and configured to engage a back side of the control wheel and to be secured on the control wheel when the control wheel engaging member is in engagement with the back side of the control wheel;

a rudder pedal engaging bar having a first end, a second end, and a linear retaining surface, the rudder pedal engaging bar rigidly connected to the second end of the second rod member such that the linear retaining surface is positionable in the V-shaped notch of each of the rudder pedals so as to engage each of the rudder pedals and so as to secure the rudder pedal engaging bar on the rudder pedals when the linear retaining surface is in engagement with the rudder pedals; and means for selectively locking the first rod member to the second rod member so that the control wheel engaging member engages the control wheel and the rudder pedal engaging bar engages each of the rudder pedals thereby securing the control wheel in the level position, the control column in the outward position, and the rudder pedals in the neutral position and preventing unauthorized disengagement of the control wheel engaging member and the rudder pedal engaging member from the control wheel and the rudder pedals, respectively.

2. The apparatus of claim 1 wherein each of the first and second rod members have a non-circular cross section and wherein the first rod member is matingly disposed in the second rod member such that the first rod member is non-rotatable relative to the second rod member when the first rod member is disposed in the telescoping relationship with respect to the second rod member.

3. The apparatus of claim 1 further comprising a pair of control wheel engaging members spaced apart to engage opposing radially extending portions of the control wheel.

4. The apparatus of claim 3 wherein each of the control wheel retaining members has a U-shaped configuration.

5. The apparatus of claim 1 further comprising:

a first side arm extending from the first end of the rudder pedal engaging bar so as to be positionable over the outer side of one of the rudder pedals; and a second side arm extending from the second end of the rudder pedal engaging bar so as to be positionable over the outer side of the other rudder pedal.

6. The apparatus of claim 5 wherein each of the first side arm and the second side arm is selectively adjustable along a longitudinal axis of the rudder pedal engaging bar.

7. An apparatus for use in combination with a locking pin for rigidly interlocking a control wheel and a pair of rudder pedals of an aircraft to secure the control surfaces of the aircraft operated by the control wheel and the rudder pedals in a stable position, the control wheel connected to a control column which extends through a control panel collar, the control column adapted for rotation about a longitudinal axis thereof to operate the aileron control surfaces of the aircraft between a level position, a right bank position, and a left bank position and adapted for reciprocating movement between an inward position and an outward position along the longitudinal axis of the control column to operate the elevator control surfaces of the aircraft, the locking pin disposed through aligned holes of the control column and the control panel collar to interlock the control column is with the control panel collar, each of the rudder pedals having a pair of angled portions forming a substantially V-shaped notch and movable between a neutral position and a depressed position to operate the rudder control surface of the aircraft, the apparatus comprising:

a first rod member having a first end and a second end;

a second rod member having a first end and a second end, the second rod member disposed in a telescoping relationship with respect to the first rod member;

a control wheel engaging member rigidly connected to the first end of the first rod member and configured to engage a back side of the control wheel and to be secured on the control wheel when the control wheel engaging member is in engagement with the back side of the control wheel;

a rudder pedal engaging bar having a first end, a second end, and a linear retaining surface, the rudder pedal engaging bar rigidly connected to the second end of the second rod member such that the linear retaining surface is positionable in the V-shaped notch of each of the rudder pedals so as to engage each of the rudder pedals and so as to secure the rudder pedal engaging bar on the rudder pedals when the linear retaining surface is in engagement with the rudder pedals; and means for selectively locking the first rod member to the second rod member so that the control wheel engaging member engages the control wheel and the rudder pedal engaging bar engages each of the rudder pedals thereby securing the rudder pedals in the neutral position and preventing unauthorized disengagement of the control wheel engaging member and the rudder pedal engaging member from the control wheel and the rudder pedals, respectively.

8. The apparatus of claim 7 wherein each of the first and second rod members have a non-circular cross section and wherein the first rod member is matingly disposed in the second rod member such that the first rod member is non-rotatable relative to the second rod member when the first rod member is disposed in the telescoping relationship with respect to the second rod member.

9. The apparatus of claim 7 further comprising a pair of control wheel engaging members spaced apart to engage opposing radially extending portions of the control wheel.

10. The apparatus of claim 9 wherein each of the control wheel retaining members has a U-shaped configuration.

11. The apparatus of claim 7 further comprising:

a first side arm extending from the first end of the rudder pedal engaging bar so as to be positionable over the outer side of one of the rudder pedals; and a second side arm extending from the second end of the rudder pedal engaging bar so as to be positionable over the outer side of the other rudder pedal.

12. The apparatus of claim 11 wherein each of the first side arm and the second side arm is selectively adjustable along a longitudinal axis of the rudder pedal engaging bar.

13. A kit for locking the control surfaces of an aircraft operated by a control wheel and a pair of rudder pedals, the control wheel connected to a control column which extends through a control panel collar, the control column adapted for rotation about a longitudinal axis thereof to operate the aileron control surfaces of the aircraft between a level position, a right bank position, and a left bank position and the control column adapted for reciprocating movement between an inward position and an outward position along the longitudinal axis of the control column to operate the elevator control surfaces of the aircraft, the control column having a pair of locking pin receiving holes that are alignable with a corresponding pair of locking pin receiving holes of the control panel collar, each of the rudder pedals movable between a neutral position and a depressed position to operate the rudder control surface of the aircraft, the kit comprising:

a locking pin adapted to be disposed through the aligned locking pin receiving holes of the control column and the control panel collar, the locking pin having a recess formed therein for lockingly receiving a portion of the control column when the locking pin is inserted into the locking pin receiving holes of the control column and the control panel collar and the control column is moved relative to the control panel collar along the longitudinal axis of the control column to a pin locking position wherein the locking pin receiving holes of the control column and the locking pin receiving holes of the control panel collar are misaligned relative to each other such that a portion of the control column is lockingly disposable in the recess of the locking pin; and a locking apparatus rigidly positionable between the control wheel and the rudder pedals with one end retainingly engaged against the control wheel and another end retainingly engaged against each of the rudder pedals so as to support the control column in the pin locking position thereby preventing unauthorized removal of the locking pin from the control column and the locking the rudder pedals in the neutral position.

14. The kit of claim 13 wherein the recess of the locking pin is annular.

15. The kit of claim 13 wherein each of the rudder pedals has a pair of angled portions forming a substantially V-shaped notch, and wherein the locking apparatus further comprises:

a first rod member having a first end and a second end;

a second rod member having a first end and a second end, the second rod member disposed in a telescoping relationship with respect to the first rod member;

a control wheel engaging member rigidly connected to the first end of the first rod member and configured to engage a back side of the control wheel and to be secured on the control wheel when the control wheel engaging member is in engagement with the back side of the control wheel;

a rudder pedal engaging bar having a first end, a second end, and a linear retaining surface, the rudder pedal engaging bar rigidly connected to the second end of the second rod member such that the linear retaining surface is positionable in the V-shaped notch of each of the rudder pedals so as to engage each of the rudder pedals and so as to secure the rudder pedal engaging bar on the rudder pedals when the linear retaining surface is in engagement with the rudder pedals; and means for selectively locking the first rod member to the second rod member so that the control wheel engaging member engages the control wheel and the rudder pedal engaging bar engages each of the rudder pedals thereby securing the rudder pedals in the neutral position and preventing unauthorized disengagement of the control wheel engaging member and the rudder pedal engaging member from the control wheel and the rudder pedals, respectively.

16. The apparatus of claim 15 wherein each of the first and second rod members have a non-circular cross section and wherein the first rod member is matingly disposed in the second rod member such that the first rod member is non-rotatable relative to the second rod member when the first rod member is disposed in the telescoping relationship with respect to the second rod member.

17. The apparatus of claim 15 further comprising a pair of control wheel engaging members spaced apart to engage opposing radially extending portions of the control wheel.

18. The apparatus of claim 17 wherein each of the control wheel retaining members has a U-shaped configuration.

19. The apparatus of claim 15 further comprising:
  a first side arm extending from the first end of the of the rudder pedal engaging bar so as to be positionable over the outer side of one of the rudder pedals; and
  a second side arm extending from the second end of the rudder pedal engaging bar so as to be positionable over the outer side of the other rudder pedal.

20. The apparatus of claim 19 wherein each of the first side arm and the second side arm is selectively adjustable along a longitudinal axis of the rudder pedal engaging bar.

21. A kit for locking the control surfaces of an aircraft operated by a control wheel and a pair of rudder pedals, the control wheel connected to a control column which extends through a control panel collar, the control column adapted for rotation about a longitudinal axis thereof to operate the aileron control surfaces of the aircraft between a level position, a right bank position, and a left bank position and the control column adapted for reciprocating movement between an inward position and an outward position along the longitudinal axis of the control column to operate the elevator control surfaces of the aircraft, the control column having a pair of locking pin receiving holes that are alignable with a corresponding pair of locking pin receiving holes of the control panel collar, each of the rudder pedals movable between a neutral position and a depressed position to operate the rudder control surface of the aircraft, the kit comprising:
  a locking pin adapted to be disposed through the aligned locking pin receiving holes of the control column and the control panel collar, the locking pin having a first recess formed therein for lockingly receiving a portion of the control column and a second recess formed therein and spaced from the first recess for lockingly receiving a diametrically opposing portion of the control column when the locking pin is inserted into the locking pin receiving holes of the control column and the control panel collar and the control column is moved relative to the control panel collar along the longitudinal axis of the control column to a pin locking position wherein the locking pin receiving holes of the control column and the locking pin receiving holes of the control panel collar are misaligned relative to each other; and
  a locking apparatus rigidly positionable between the control wheel and the rudder pedals with one end retainingly engaged against the control wheel and another end retainingly engaged against each of the rudder pedals for locking the rudder pedals in the neutral position and for supporting the control column in the pin locking position thereby preventing unauthorized removal of the locking pin from the control column.

22. The kit of claim 21 wherein each of the first and second recesses is annular.

23. The kit of claim 21 wherein the width of the second recess is greater than the length of the first recess.

24. A method of securing the control surfaces of an aircraft having a control wheel connected to a control column which extends through a control panel collar, the control column adapted for rotation about a longitudinal axis thereof to operate the aileron control surfaces of the aircraft between a level position, a right bank position and a left bank position and for moving the control column between an inward position and an outward position along the longitudinal axis of the control column to operate the elevator control surfaces of the aircraft, the control column having a pair of locking pin receiving holes that are alignable with a pair of locking pin receiving holes of the control panel collar, the aircraft further having a pair of rudder pedals, each movable between a neutral position and a depressed position to operate the rudder control surface of the aircraft, the method comprising the step of:
  aligning the locking pin receiving holes of the control column with the locking pin receiving holes of the control panel collar;
  inserting a locking pin having a recess formed therein into the aligned locking pin holes so that the recess is positioned to lockingly receive a portion of the control column;
  moving the control column relative to the control panel collar along the longitudinal axis of the control column to a pin locking position wherein the locking pin receiving holes of the control column and the locking pin receiving holes of the control panel collar are misaligned relative to each other such that a portion of the control column is lockingly disposed in the recess of the locking pin; and
  rigidly interlocking the control wheel with each of the rudder pedals so as to support the control column in the pin locking position thereby preventing unauthorized removal of the locking pin from the control column and locking the rudder pedals in the neutral position.

25. The method of claim 24 wherein each of the rudder pedals has a pair of angled portions forming a substantially V-shaped notch, and wherein the interlocking step further comprises:
  providing a first rod member having a control wheel engaging member rigidly connected to one end thereof and configured to engage a back side of the control wheel and to be secured on the control wheel when the control wheel engaging member is in engagement with the back side of the control wheel;
  providing a second rod member having a rudder pedal engaging bar having a first end, a second end, and a linear retaining surface, the rudder pedal engaging bar rigidly connected to one end of the second rod member, the second rod member disposed in a telescoping relationship with respect to the first rod member;
  positioning the linear retaining surface in the V-shaped notch of each of the rudder pedals so as to engage each of the rudder pedals;
  positioning the control wheel retaining member on the back side of the control wheel; and
  locking the first rod member to the second rod member so that the control wheel engaging member engages the control wheel and the rudder pedal engaging bar engages each of the rudder pedals thereby securing the rudder pedals in the neutral position and preventing unauthorized disengagement of the control wheel engaging member and the rudder pedal engaging member from the control wheel and the rudder pedals, respectively.

* * * * *

UNITED STATES PATENT AND TRADEMARK OFFICE
CERTIFICATE OF CORRECTION

| | | |
|---|---|---|
| PATENT NO. | : 5,911,391 | Page 1 of 4 |
| APPLICATION NO. | : 08/878382 | |
| DATED | : June 15, 1999 | |
| INVENTOR(S) | : Richard T. Russ et al. | |

It is certified that error appears in the above-identified patent and that said Letters Patent is hereby corrected as shown below:

In the Drawings:

FIG. 4, please insert the following numeric designations:

-- 128 -- for the cross member
-- 135 -- for the lever
-- 136 -- for the lever
-- 138 -- for the upper treaded portion
-- 140 -- for the intermediate portion
-- 141 -- for the lower portion as shown in attached.

FIG. 5, please insert the numeral -- 174 -- to designate the hole through the cross bar 156 as shown in attached.

FIG. 6, please delete the reference numeral "142" designating the lower portion of the rudder pedal and substitute therefor -- 141 -- as shown in attached.

In the Description

| | |
|---|---|
| Column 2: | line 11, delete "is". |
| Column 5: | line 34, after "end" and before "of", insert -- 62 -- .<br>line 40, delete "engagable" and substitute therefor<br>-- engageable-- . |
| Column 8: | line 15, after "member" and before "having", insert -- 128 -- .<br>line 41, after "levers" and before "136.", insert -- 135 -- .<br>line 56, after "pin" and before "is", insert -- 143 -- .<br>line 56, after "holes" and before ",", insert -- 146a, 148a and 146b and 148b, respectively -- . |
| Column 10: | line 3, after "hole" and before "provided", insert -- 174 -- .<br>lines 62-63, delete "engagable" and substitute -- engageable -- therefor. |

UNITED STATES PATENT AND TRADEMARK OFFICE
CERTIFICATE OF CORRECTION

| | |
|---|---|
| PATENT NO. | : 5,911,391 |
| APPLICATION NO. | : 08/878382 |
| DATED | : June 15, 1999 |
| INVENTOR(S) | : Richard T. Russ et al. |

It is certified that error appears in the above-identified patent and that said Letters Patent is hereby corrected as shown below:

In the Description (cont'd)

Column 13:  line 36, delete "124" and substitute -- 124*a* -- therefor.
line 38, delete "126" and substitute -- 126*a* -- therefor.
line 39, delete "124" and substitute -- 124*a* -- therefor.
line 40, delete "122" and substitute -- 122*a* -- therefor.
line 41, delete "124" and substitute -- 124*a* -- therefor.

Signed and Sealed this

Sixth Day of November, 2007

JON W. DUDAS
*Director of the United States Patent and Trademark Office*